US012691607B2

(12) United States Patent
Thibeault et al.

(10) Patent No.: US 12,691,607 B2
(45) Date of Patent: Jul. 28, 2026

(54) METHODS FOR MANUFACTURING BUILDING BOARDS

(71) Applicant: CertainTeed Gypsum, Inc., Malvern, PA (US)

(72) Inventors: John Thibeault, Las Vegas, NV (US); Robert J. Belanger, Malvern, PA (US); Anirban Ghosh, Philadelphia, PA (US)

(73) Assignee: CertainTeed Gypsum, Inc., Malvern, PA (US)

( * ) Notice: Subject to any disclaimer, the term of this patent is extended or adjusted under 35 U.S.C. 154(b) by 30 days.

(21) Appl. No.: 18/270,411

(22) PCT Filed: Dec. 29, 2021

(86) PCT No.: PCT/US2021/065481
§ 371 (c)(1),
(2) Date: Jun. 29, 2023

(87) PCT Pub. No.: WO2022/147098
PCT Pub. Date: Jul. 7, 2022

(65) Prior Publication Data
US 2024/0075652 A1     Mar. 7, 2024

Related U.S. Application Data

(60) Provisional application No. 63/131,663, filed on Dec. 29, 2020.

(51) Int. Cl.
*B29C 67/00*        (2017.01)
*B28B 11/04*        (2006.01)
(Continued)

(52) U.S. Cl.
CPC .......... *B28B 11/048* (2013.01); *B28B 11/243* (2013.01); *B28B 11/248* (2013.01); *C04B 28/04* (2013.01); *C04B 28/141* (2013.01)

(58) Field of Classification Search
CPC ..................................................... B28B 11/048
See application file for complete search history.

(56) References Cited

U.S. PATENT DOCUMENTS 4,064,317 A     12/1977  Fukuba
4,222,984 A      9/1980  Ladwig
(Continued)

FOREIGN PATENT DOCUMENTS

JP      2006150692 A     6/2006
WO      2002012141 A1    2/2002
WO      2018112392 A1    6/2018

*Primary Examiner* — Nicholas Krasnow
(74) *Attorney, Agent, or Firm* — McDonnell Boehnen Hulbert & Berghoff LLP

(57)          ABSTRACT

The present disclosure relates generally to methods of manufacturing plasterboards, such as gypsum wallboards. One aspect of the disclosure is a method of manufacturing a building board that includes providing a wet building board by allowing a plaster slurry to set between opposing facings, the wet building board having a set plaster core disposed between the facings; and providing a surfactant (such as a quaternary ammonium salt surfactant) on at least one of the facings (e.g., by applying an aqueous surfactant-containing composition to the facing); then conducting the wet building board to a drying oven, for example, via one or more conveyers (e.g., rollers and/or belts and/or rails); and drying the wet building board in the drying oven to provide the building board.

19 Claims, 1 Drawing Sheet

(51) Int. Cl.
    *B28B 11/24*        (2006.01)
    *C04B 28/04*        (2006.01)
    *C04B 28/14*        (2006.01)

(56)            References Cited

U.S. PATENT DOCUMENTS

| | | | |
|---|---|---|---|
| 4,564,544 | A | 1/1986 | Burkard |
| 5,256,222 | A * | 10/1993 | Shepherd .............. C04B 14/185 |
| | | | 156/45 |
| 6,153,040 | A * | 11/2000 | Rohlf ...................... B32B 13/08 |
| | | | 156/39 |
| 6,680,127 | B2 | 1/2004 | Capps |
| 6,773,822 | B2 | 8/2004 | Capps |
| 8,747,534 | B2 | 6/2014 | Rohlf |
| 9,051,221 | B2 | 6/2015 | Lecomte |
| 9,532,568 | B2 | 1/2017 | Langselius |
| 9,868,866 | B2 | 1/2018 | Daoust |
| 10,138,394 | B2 | 11/2018 | Huda |
| 10,155,692 | B2 | 12/2018 | Dubey |
| 2005/0066622 | A1 | 3/2005 | Lee |
| 2010/0186870 | A1 * | 7/2010 | Stuart ...................... C04B 28/14 |
| | | | 106/661 |
| 2012/0088114 | A1 * | 4/2012 | Rohlf ...................... D21H 21/36 |
| | | | 162/161 |
| 2013/0225409 | A1 * | 8/2013 | Allen ................... C07C 229/12 |
| | | | 564/204 |
| 2015/0030862 | A1 | 1/2015 | Rohlf |
| 2015/0252303 | A1 * | 9/2015 | Demmer ............... C11D 3/046 |
| | | | 134/1 |
| 2018/0080226 | A1 | 3/2018 | Lu |
| 2019/0111168 | A1 * | 4/2019 | Bäumler ............... A61K 8/068 |
| 2020/0120935 | A1 | 4/2020 | Wilson |
| 2020/0207060 | A1 | 7/2020 | Busche |
| 2020/0208398 | A1 | 7/2020 | Stav |
| 2021/0339217 | A1 * | 11/2021 | Feng ........................ B01J 13/22 |
| 2023/0079912 | A1 * | 3/2023 | Dussaud ................. C09D 7/65 |
| | | | 106/287.11 |

* cited by examiner

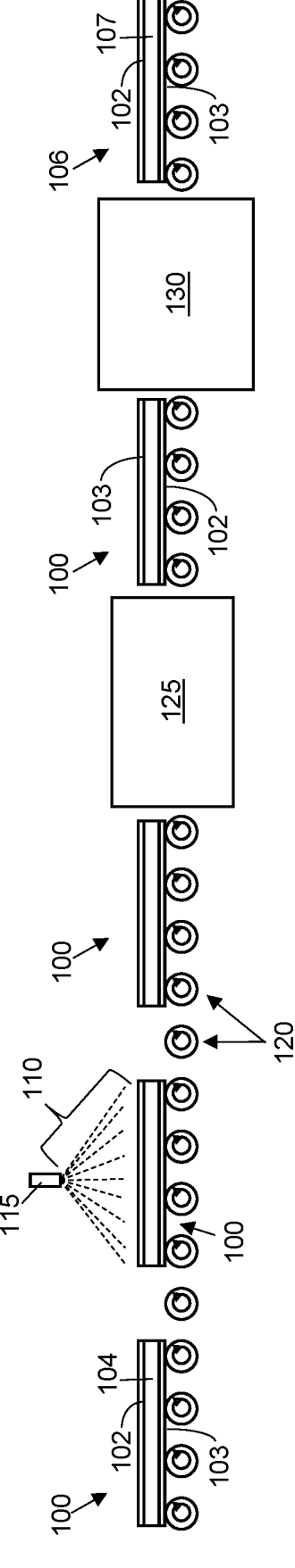

METHODS FOR MANUFACTURING BUILDING BOARDS

CROSS-REFERENCE TO RELATED APPLICATIONS

This application claims the benefit of priority of U.S. Provisional Patent Application No. 63/131,663, filed Dec. 29, 2020, which is hereby incorporated herein by reference in its entirety.

BACKGROUND OF THE DISCLOSURE

Field

The present disclosure relates generally to methods of manufacturing plasterboards, such as gypsum wallboards.

Technical Background

Plasterboard products are commonplace in the construction of internal partitions of buildings. These products include boards, panels, and tiles that may be employed to construct walls and ceilings. They are most often made with gypsum as the primary plaster component.

Such plasterboard products are conventionally produced by forming an aqueous plaster slurry between two facings in sheet form (often paper) and allowing the slurry to set, creating a set plaster core. The products are then cut to an appropriate size and conducted to a drying oven to drive off any residual moisture. For the mass production of plasterboard products, conveyor belts, rollers, and other conventional mechanical conveyance systems are typically used in transferring the products between each stage. Also, plasterboards are often slid over one another, e.g., as they are stacked for storage and shipment. In board handling, one mode of potential damages that can occur, generally referred to as 'peelers' or 'rollers', are caused by the facing of the plasterboard being peeled away from the set plaster core and, e.g., rolling under itself, ruining the smooth, flat appearance of the board surface. Scratches or other marring of the facing surface can also appear. However, having a smooth, flat surface is desirable for the functionality and aesthetics of the plasterboard product. Accordingly, there remains a distinct need to develop a robust method for manufacturing plasterboard that decreases the frequency of such damage.

SUMMARY

As described in detail herein, the present inventors have found a method for manufacturing a building board that decreases the frequency of damage to the board by providing a surfactant on at least one facing of the plasterboard before the drying of the plasterboard.

The present inventors have noted that damage to plasterboards during manufacture can be caused by the conveyers themselves, e.g., the rollers, belts and rails used to conduct the plasterboards along the line to, through and especially beyond the dryer, as well as by the sliding of boards against one another, e.g., when being stacked into so-called "books." Without intending to be bound by theory, the inventors believe that it is the interface between facing (often paper) and opposing surfaces (e.g., conveyers or other boards) that causes the damage, e.g., by grabbing a facing and peeling it away from the board, especially during and after the drying process. The present inventors have found that providing a surfactant on a facing (e.g., by applying certain aqueous surfactant-containing compositions to the facing), especially a facing that contacts the conveyers and/or other boards during the manufacturing process, can significantly reduce the amount of such damage.

Thus, in one aspect, the disclosure provides a method for manufacturing a building board. Such a method includes:

providing a wet building board by allowing a plaster slurry to set between opposing facings, the wet building board having a set plaster core disposed between the facings; and providing a surfactant (such as a quaternary ammonium salt surfactant) on at least one of the facings (e.g., by applying an aqueous surfactant-containing composition to the facing); then conducting the wet building board to a drying oven, for example, via one or more conveyers (e.g., rollers and/or belts and/or rails); and drying the wet building board in the drying oven to provide the building board.

The method can further include conducting the building board beyond the drying oven via one or more conveyers (e.g., rollers and/or belts) in contact with the facing having the surfactant thereon.

In various embodiments, the surfactant is a quaternary ammonium salt surfactant.

In various embodiments, the methods of the disclosure are performed using a fabric softener composition (e.g. as sold commercially for use in washing machines for fabric care) to provide the aqueous surfactant-containing composition (e.g. by using an aqueous surfactant-containing composition that includes a fabric softener diluted with water).

Another aspect of the disclosure is a building board comprising a dry plaster core disposed between opposing facings, at least one facing having disposed thereon a surfactant (such as a quaternary ammonium salt surfactant). The building board can be made, e.g., using the methods described herein.

Other aspects of the disclosure will be apparent to those skilled in the art in view of the description that follows.

BRIEF DESCRIPTION OF THE DRAWING

The FIGURE is a schematic side view of a continuous process of the method according one embodiment of the disclosure as described in the Example.

DETAILED DESCRIPTION

The present disclosure provides a method of manufacturing plasterboard, e.g. wallboard, panel, or tile. Such plasterboards are often based on gypsum-containing materials, which can be provided from any source (e.g., mined or byproduct from industrial sources such as citric/lactic acid processing, water treatment plants, power plants, phosphoric acid processing). However, the present disclosure does contemplate that other plaster materials can be used, e.g., syngenite/struvite-K. The inventors have noted that in the manufacture of plasterboard, especially moisture resistant plasterboard, board surfaces can have a tendency to be damaged by contact with opposing surfaces, e.g., conveyors of the mechanical conveyance system or other boards, especially during and after drying. This action can cause damage to the appearance of the plasterboard surface, lower the water repellency performance, and can affect the efficiency and reliability of production.

The present inventors have found a method for manufacturing a building board that reduces the frequency of damage (e.g., by peelers and/or rollers) to the board by providing a surfactant on one or more facings of the board before drying the plasterboard. Without wishing to be bound by theory, it is believed that compounds within the plaster core migrate to the facing of the plasterboard and compromise the adhesion between the facing and the core of the plasterboard. These compounds can also volatilize and form particulates during drying, which can deposit on the facing and increase friction between the facing) and surfaces it contacts (e.g., conveyers, other boards), causing the opposing surface to grab and pull the facing away from the core. The inventors have found that by providing a surfactant on the facing as described herein, damage is significantly reduced. Again, without intending to be bound by theory, the inventors believe that this reduces the friction between the facing and contacting surfaces, e.g., by reducing surface charge of the facing, thus reducing the deposition of particulate species thereon. Thus, by providing a surfactant on the facing, e.g., by applying an aqueous surfactant-containing composition to the facing, the inventors have found an advantageous method to decrease the incidence of damaged plasterboards. The overall process allows a more reliable and efficient production of the plasterboard. This is especially advantageous with respect to paper facings as described herein.

Accordingly, one aspect of the disclosure provides a method for manufacturing a building board. Such a method includes:

providing a wet building board by allowing a plaster slurry to set between opposing facings, the wet building board having a set plaster core disposed between the facings; and providing a surfactant (such as a quaternary ammonium salt surfactant) on at least one of the facings (e.g., by applying an aqueous surfactant-containing composition to the facing); then conducting the wet building board to a drying oven, for example, via one or more conveyers (e.g., rollers and/or belts and/or rails); and drying the wet building board in the drying oven to provide the building board.

The present inventors note that the damage described herein is especially problematic with respect to paper facings, and that it has been demonstrated that the provision of a surfactant on a paper facing can significantly reduce the rate of damage. Accordingly, in various desirable embodiments as otherwise described herein, at least one facing on which the surfactant is provided is a paper facing. However, in other embodiments, facing on which the surfactant is provided is a fiberglass mat (e.g., uncoated, or coated with a cementitious layer), or a polymer layer (e.g., a thermoplastic such as poly(vinyl chloride)).

An embodiment according to the disclosure is shown in schematic side view in the FIGURE. Here, the method is depicted as a continuous process, with building boards being conducted from left to right in the drawing. Here, wet building boards 100 are provided by allowing a plaster slurry to set between opposing facings (102, 103), to provide each wet building board with a set plaster core 104 disposed between the facings. As used herein, a building board is "wet" after it has been formed from a slurry but before it has been conducted into a drying oven. In various desirable embodiments, at least one facing is a paper facing; here, both facings 102 and 103 are paper facings. Critically, an aqueous surfactant-containing composition 110 is applied to the facing 102. In the embodiment shown in the FIGURE, an applicator 115 is used to apply the aqueous surfactant-containing composition to the facing. In this embodiment, the applicator 115 is a sprayer, applying the aqueous surfactant-containing composition in the form of a spray. Of course, the person of ordinary skill in the art will appreciate that other application methods can be used. And while in this embodiment the surfactant is provided on the facing after the boards are formed and cut, the present inventors contemplate that it can be provided at any point in the process before the boards enter the drying oven, including being provided as part of the facing feed itself. The wet building board is then conducted to a drying oven via one or more conveyers (here, rollers 120) in contact with the facing 102, and dried in the drying oven 130 to provide the building board 106, which has a dry plaster core 107 disposed between the facings 102 and 103. One or more conveyers can conduct the building board 106 beyond the drying oven. Building board 106 can be finished, e.g., in any conventional manner in the art.

The person of ordinary skill in the art will appreciate that wet building board can be conducted through the system in a variety of manners. For example, in the embodiment of the FIGURE, the facing 102 faces upward and the aqueous surfactant-containing composition is applied from the top, then the board is inverted by an inverter 125, such that the facing 102 on which the aqueous surfactant-containing composition has been dispensed faces downward.

As noted above, the present inventors have found that a surfactant on the surface of the facing can help reduce the occurrence of damage to the facing as it is conveyed through the manufacturing line, e.g., from contact with conveyors and/or with other boards, especially during and after drying. Without intending to be bound by theory, the present inventors believe that one of the causes of such damage is a buildup of charge on the surface of the facing. Accordingly, in various embodiments of the disclosure, the surfactant is an ionic surfactant, e.g., a cationic surfactant or an anionic surfactant.

In various embodiments as otherwise described herein, the surfactant is a quaternary ammonium salt surfactant. The present inventors have found such surfactants to be especially useful in reducing the occurrence of defects, especially when the facing is paper. A wide variety of quaternary ammonium salt surfactants are known, and the person of ordinary skill in the art can select an appropriate one based on the disclosure herein.

In various embodiments as otherwise described herein, the quaternary ammonium salt surfactant comprises (or is) an esterquat. As the person of ordinary skill in the art will appreciate, an esterquat is a quaternary ammonium salt surfactant having an ester linkage in at least one of its hydrophobic chains. A variety of esterquats are known, especially with reference to the fabric softener art. For example, in various embodiments, as otherwise described herein, the quaternary ammonium salt surfactant includes one or more of monoesterquats (i.e., having one hydrophobic chain with an ester linkage), diesterquats (having two hydrophobic chains with ester linkages), and triesterquats (having three hydrophobic chains with ester linkages).

Diesterquats are common esterquats, and the present inventors have determined that these are operational here. Accordingly, in various embodiments as otherwise described herein, the esterquat comprises mostly diesterquats. For example, in some embodiments, the amount of diesterquat in the esterquat component is at least 75%, e.g., at least 90%, or at least 95%, or at least 99%. As esterquats can be made from the corresponding alkanolamines, a diesterquat can be synthesized without significant amounts of mono- or triesterquat.

In various embodiments as otherwise described herein, the esterquat is selected from the group consisting of triethanolamine esterquats, diethanolamine esterquats (e.g. DEEDMACs), and 3-(dimethylamino)-1,2-propanediol esterquats (e.g. so-called "Hamburg esterquats"). In various embodiments, the esterquat is selected from the group consisting of methyldiethanolamine esterquats, dimethylethanolamine esterquats, or methylethanolamine esterquats. Combinations of such esterquats can also be used.

An esterquat can be provided as an esterification reaction product of a tertiary alkanolamine and a carboxylic acid, which is then quaternized. In various embodiments, the esterquat is the esterification reaction product of a tertiary alkanolamine with a long-chain fatty acyl group (e.g., from a corresponding carboxylic acid, anhydride or acid halide). As used herein, a long-chain fatty acyl is a $C_{12}$-$C_{22}$ alkylacyl, which can have one or more unsaturations. For example, in various embodiments, the long-chain fatty acyl is based on lauric acid, myristic acid, palmitic acid, oleic acid, or stearic acid; the person of ordinary skill in the art will appreciate that others may be suitable as well. The person of ordinary skill in the art will appreciate that naturally-occurring triglycerides (e.g., coconut oil, palm oil) can be used to provide the fatty acyl, and as such there will often be a range of fatty acyl groups in a sample of esterquat. As used herein, a $C_x$ value indicates that the weight-average chain length is x. In various embodiments, the tertiary alkanolamine is a tertiary $C_1$-$C_4$ alkanolamine. For example, in various embodiments, the tertiary alkanolamine is selected from the group consisting of triethanolamine, methyldiethanolamine, dimethylethanolamine, methylethanolamine, and 3-(dimethylamino)-1,2-propanediol. In various embodiments, the esterification reaction product is quaternized with an alkyl halide, e.g. a $C_1$-$C_4$ alkyl halide. For example, in various embodiments, the esterification reaction product is quaternized with methyl chloride. In other embodiments, the esterification reaction product is quaternized with dimethyl sulfate. In various embodiments, the esterification reaction product is quaternized with a benzyl halide. For example, in various embodiments, the esterification reaction product is quaternized with benzyl chloride.

In various embodiments, the esterquat has an ammonium cation having the structural formula $(R^1)_nN^+((CHR^2)_xOC(O)R^3)_{(4-n)}$ in which n is 1, 2 or 3; each $R^1$ is independently methyl, ethyl or benzyl; x is 2 or 3; each $R^2$ is independently hydrogen or methyl; and each $R^3$ is $C_{12}$-$C_{22}$ alkyl (which can have one or more unsaturations); and X is an anion, e.g., chloride, bromide, acetate. In certain such embodiments, n is 2, i.e., the esterquat is a diesterquat. In certain such embodiments, n is 1, i.e., the esterquat is a triesterquat. In certain such embodiments, n is 3, i.e., the esterquat is a monoesterquat. In various embodiments as otherwise described herein, each $R^1$ is methyl or ethyl, e.g., methyl. In various embodiments as otherwise described herein, x is 2. In various embodiments as otherwise described herein each $R^2$ is hydrogen. In various embodiments as otherwise described herein, the average $R^3$ size for the sample is in the range of $C_{12}$-$C_{20}$, e.g., $C_{14}$-$C_{18}$.

The present inventors contemplate that other quaternary ammonium salts are useful in the methods described herein. For example, in various embodiments, the quaternary ammonium salt surfactant is a tetraalkylammonium salt, such as a dialkyldimethylammonium salt. Examples of such salts have ammonium cations having the structural formula $(R^5)(R^6)(R^7)(R^8)N^+$, in which each of $R^5$, $R^6$, $R^7$ and $R^8$ are $C_1$-$C_{22}$ alkyl, provided that the total number of carbons in $R^5$, $R^6$, $R^7$ and $R^8$ is at least 12, e.g., at least 16. For example, in various embodiments each of $R^5$ and $R^6$ is independently methyl or ethyl (e.g., methyl), and each of $R^7$ and $R^8$ is independently $C_{12}$-$C_{22}$. For example, in various embodiments each of $R^5$, $R^6$ and $R^7$ is independently methyl or ethyl (e.g., methyl), and $R^8$ is $C_{12}$-$C_{22}$. As above, the long-chain hydrocarbon chains of the ammonium can be derived from natural sources and thus will often be present in a distribution of chain lengths. In various embodiments as otherwise described herein, the average long-chain hydrocarbon size for the sample (i.e., $R^7/R^8$ or $R^8$ in the two previously-mentioned embodiments) is in the range of $C_{12}$-$C_{20}$, e.g., $C_{14}$-$C_{18}$.

For example, in various embodiments as otherwise described herein, the quaternary ammonium salt surfactant is a di($C_8$-$C_{22}$ alkyl)dimethyl ammonium salt, a di($C_{12}$-$C_{20}$ alkyl)dimethyl ammonium salt, a di($C_{16}C_{18}$ alkyl)dimethyl ammonium salt. In various embodiments, the quaternary ammonium salt is selected from the group consisting of dioctadecylmethyl ammonium chloride, dihexadecyldimethyl ammonium chloride, and dehydrogenatedtallowdimethyl arenonium chloride. In some embodiments, the aqueous composition comprises a combination of dialkyldimethylammonium salts. For example, in various embodiments the aqueous composition comprises a combination of dioctadecylmethyl ammonium chloride, dihexadecyldimethyl ammonium chloride, and dehydrogenatedtallowdimethyl ammonium chloride.

In various embodiments, the quaternary ammonium salt surfactant comprises esterquats, dialklydimethyl ammonium salts, or combinations thereof. For example, in various embodiments, the aqueous composition comprises at least one esterquat or at least one dialkyldimethylammonium salt. In various embodiments, the aqueous composition comprises at least one esterquat and at least one dialkyldimethylammonium salt.

The quaternary ammonium salts described for use herein can be provided with a variety of anions. For example, in various embodiments, the anion is selected from the group consisting of bromide, chloride, sulfate, and sulfonate. However, as the person of ordinary skill in the art will appreciate, other anions may be useful.

Surfactants can be provided with a variety of so-called "HLB" values—the "hydrophile-lipophile balance," which rate surfactants on a scale from lipophilic (0-9) to hydrophilic (11-20). In various embodiments as otherwise described herein, the quaternary ammonium salt surfactant has an HLB value in the range of 1-19, e.g., in the range of 1-15, or 1-11, or 5-19, or 5-15, or 5-11, or 9-19, or 9-15.

The person of ordinary skill in the art will, based on the disclosure herein, select a desirable concentration of quaternary ammonium salt surfactant in the aqueous composition. The present inventors have found that relatively dilute solutions can be used. For example, in various embodiments as otherwise described herein, the quaternary ammonium salt surfactant is present in the aqueous composition in an amount of no more than 2 wt. %, e.g. no more than 1 wt. %, or no more than 0.5 wt. %. In various embodiments, the quaternary ammonium salt surfactant is present in the aqueous composition in an amount of no more than 0.2 wt. %, e.g., no more than 0.1 wt. %, or no more than 0.05 wt. %. Thus, relatively small amounts can be used. In various embodiments, the quaternary ammonium salt surfactant is present in the aqueous composition in an amount of at least 0.0002 wt. %, e.g. at least 0.0005 wt. %, or at least 0.0001 wt. %. In various embodiments, the quaternary ammonium salt surfactant is present in the aqueous composition in an amount of at least 0.002 wt. %, e.g., at least 0.005 wt. %, or at least 0.01 wt. %.

For example, in various embodiments, the quaternary ammonium salt surfactant is present in the aqueous composition in an amount in the range of 0.0002-2 wt. %, e.g., 0.0002-1 wt. %, or 0.0002-0.5 wt. %, or 0.0002-0.2 wt. %, or 0.0002-0.1 wt. %, or 0.0002-0.05 wt. %, or 0.0005-2 wt. %, or 0.0005-1 wt. %, or 0.0005-0.5 wt. %, or 0.0005-0.2 wt. %, or 0.0005-0.1 wt. %, or 0.0005-0.05 wt. %. In various embodiments, the quaternary ammonium salt surfactant is present in the aqueous composition in an amount in the range of 0.001-2 wt. %, e.g., 0.001-1 wt. %, or 0.001-0.5 wt. %, or 0.001-0.2 wt. %, or 0.001-0.1 wt. %, or 0.001-0.05 wt. %, or 0.002-2 wt. %, 0.002-1 wt,%, or 0.002-0.5 wt,%, or 0.002-0.2 wt. %, or 0.002-0.1 wt. %, or 0.002-0.05 wt. %. In various embodiments, the quaternary ammonium salt surfactant is present in the aqueous composition in an amount in the range of 0.005-2 wt,%, e.g., 0.005-1 wt. %, or 0.005-0.5 wt. %, or 0.005-0.2 wt. %, or 0.005-0.1 wt. %, or 0.005-0.05 wt. %, or 0.01-2 wt. %, 0.01-1 wt. %, or 0.01-0.5 wt. %, or 0.01-0.2 wt. %, or 0.01-0.1 wt. %, or 0.01-0.05 wt. %.

In various embodiments, the aqueous composition comprises an emulsifier. Many commercial materials that include a quaternary ammonium salt surfactant (e.g., fabric softeners as described below) further include an emulsifier to maintain the quaternary ammonium salt surfactant in suspension, especially when the quaternary ammonium salt surfactant is relatively lipophilic and is present in a high concentration. For example, in various embodiments, the surfactant is a cationic surfactant and the emulsifier comprises a non-ionic surfactant, an anionic surfactant, or a combination thereof. In various embodiments, the non-ionic surfactant is selected from the group consisting of alkoxylated fatty alcohols and alkoxylated fatty esters. In various embodiments, the anionic surfactant is selected from the group consisting of fatty alcohol ether sulfate and fatty alkyl sulfonates. In various embodiments, the emulsifier has a hydrophilic-lipophilic balance (HLB) in the range of 8-16, e.g. in the range of 10-14. In various embodiments, the emulsifier is present in the aqueous composition in an amount of no more than 1 wt. %, e.g. no more than 0.5 wt. %. In various embodiments, the emulsifier is present in the aqueous composition in an amount of no more than 0.1 wt. %, e.g. no more than 0.05 wt. %. In various embodiments, the emulsifier is present in the aqueous composition in an amount of at least 0.0001 wt. %, e.g. at least 0.0005 wt. %. In various embodiments the emulsifier is present in the aqueous composition in an amount of at least 0.001 wt. % e.g., at least 0.005 wt. %. In various embodiments, the emulsifier is present in the aqueous composition in the range of 0.0001-1 wt. %, e.g. 0.0001-0.5 wt. %, or 0.0001-0.1 wt. %, or 0.0001-0.05 wt. %, or 0.0005-1 wt. %, or 0.0005-0.5 wt. %, or 0.0005-0.1 wt. %, or 0.0005-0.05 wt. %. In various embodiments, the emulsifier is present in the aqueous composition in the range of 0.0001-1 wt. %, e.g. 0.0001-0.5 wt. %, or 0.0001-0.1 wt. %, or 0.0001-0.05 wt. %, or 0.0005-1 wt. %, or 0.0005-0.5 wt. %, or 0.0005-0.1 wt. %, or 0.0005-0.05 wt. %.

The present inventors have found that a fabric softener, e.g., as provided for use in laundry, can conveniently be used to provide the surfactant of the aqueous surfactant-containing composition. Commercial fabric softeners are typically provided in high surfactant concentration, to provide a desired concentration in the wash with the water already present. The present inventors have found that desirable surfactant concentrations for the presently claimed methods can be provided by diluting a commercial fabric softener. Accordingly, in various embodiments, the aqueous composition comprises a fabric softener, for example, diluted with water. In various embodiments, the aqueous composition comprises the fabric softener in a ratio in the range of 0.1-10 parts fabric softener per 100 parts of aqueous composition. In various embodiments, the aqueous composition comprises the fabric softener in a ratio in the range of 0.1-5 parts fabric softener per 100 parts of aqueous composition, e.g., 0.1-3 parts, or 0.1-2 parts, or 0.1-1 parts fabric softener per 100 parts of aqueous composition. In various embodiments, the aqueous composition comprises the fabric softener in a ratio in the range of 0.2-10 parts fabric softener per 100 parts of aqueous composition, e.g., 0.2-5 parts, or 0.2-3 parts, or 0.2-2 parts, or 0.2-1 parts fabric softener per 100 parts of aqueous composition. In various embodiments, the aqueous composition comprises the fabric softener in a ratio in the range of 0.5-10 parts fabric softener per 100 parts of aqueous composition, e.g., 0.5-5 parts, or 0.5-3 parts, or 0.5-2 parts fabric softener per 100 parts of aqueous composition. In various embodiments, the aqueous composition comprises the fabric softener in a ratio in the range of 1-10 parts fabric softener per 100 parts of aqueous composition, e.g., 1-5 parts, or 1-3 parts fabric softener per 100 parts of aqueous composition. As noted above, the fabric softener can be diluted in water, which can further contain other components.

The present inventors have found that providing an aqueous surfactant-containing composition on a facing can result in a beneficial reduction in the damage caused to the facing by contact with opposing surfaces (e.g., conveyors and/or other boards) in the manufacturing process. For example, in various embodiments as otherwise described herein, e.g., when an aqueous surfactant-containing composition is applied to the facing, the aqueous surfactant-containing composition is applied to the facing at a treat rate in the range of 0.005-1 gal/MSF (i.e., 1 MSF is 1000 square feet), e.g. in the range of 0.01-1 gal/MSF, or 0.02-1 gal/MSF, or 0.04-1 gal/MSF, or 0.005-0.5 gal/MSF, or 0.01-0.5 gal/MSF, or 0.02-0.5 gal/MSF, or 0.04-0.5 gal/MSF, or 0.005-0.2 gal/MSF, or 0.01-0.2 gal/MSF, or 0.02-0.2 gal/MSF, or 0.04-0.2 gal/MSF, or 0.005-0.1 gal/MSF, or 0.01-0.1 gal/MSF, or 0.02-0.1 gal/MSF, or 0.04-0.1 gal/MSF. Of course, the person of ordinary skill in the art will appreciate that other treat rates of aqueous surfactant-containing composition can be used, based especially on the concentration of surfactant in the composition.

The surfactant (e.g., the quaternary ammonium salt surfactant) provided on the facing can be present at a variety of amounts per surface area. In various embodiments as otherwise described herein, the surfactant (e.g., the quaternary ammonium salt surfactant) is provided on the facing in an amount of 0.01-10 g/MSF. For example, in various embodiments, the surfactant (e.g., the quaternary ammonium salt surfactant) is provided on the facing in an amount of 0.01-5 g/MSF, or 0.01-2 g/MSF, or 0.01-1 g/MSF, or 0.01-0.5 g/MSF, or 0.01-0.2 g/MSF. In various embodiments, the surfactant (e.g., the quaternary ammonium salt surfactant) is provided on the facing in an amount of 0.02-10 g/MSF, e.g., 0.02-5 g/MSF, or 0.02-2 g/MSF, or 0.02-1 g/MSF, or 0.02-0.5 g/MSF, or 0.02-0.2 g/MSF. In various embodiments, the surfactant (e.g., the quaternary ammonium salt surfactant) is provided on the facing in an amount of 0.05-10 g/MSF, e.g., 0.05-5 g/MSF, or 0.05-2 g/MSF, or 0.05-1 g/MSF, or 0.05-0.5 g/MSF, or 0.05-0.2 g/MSF. In various embodiments, the surfactant (e.g., the quaternary ammonium salt surfactant) is provided on the facing in an amount of 0.1-10 g/MSF, e.g., 0.1-5 g/MSF, or 0.1-2 g/MSF, or 0.1-1 g/MSF, or 0.1-0.5 g/MSF, or 0.1-0.2 g/MSF. In various embodiments, the surfactant (e.g., the quaternary ammonium salt surfactant) is provided on the facing in an amount of 0.2-10 g/MSF, e.g., 0.2-5 g/MSF, or 0.2-2 g/MSF, or 0.2-1 g/MSF, or 0.2-0.5 g/MSF. In various embodiments, the surfactant (e.g., the quaternary ammonium salt surfactant) is provided on the facing in an amount of 0.5-10 g/MSF, e.g., 0.5-5 g/MSF, or 0.5-2 g/MSF, or 0.5-1 g/MSF.

While examples of aqueous surfactant-containing composition surfactant concentrations and aqueous surfactant-containing composition application rates are provided above, the person of ordinary skill in the art will appreciate that a variety of surfactant concentrations and application rates of the aqueous surfactant-containing composition can be used to arrive at a desired application rate of the surfactant per se, e.g., in the range of 0.1-10 g/MSF or some other range as described herein.

The present inventors have found that the surfactant can be provided on the facing by applying an aqueous surfactant-containing composition to the facing, e.g., as part of a continuous manufacturing process typically used in the fabrication of plaster boards. For example, the aqueous surfactant-containing composition can be applied as a spray. This application can be accomplished by any means as is known in the art. In various embodiments, the aqueous composition is applied with an airless sprayer, a high volume low pressure sprayer, a low volume low pressure sprayer, or a compressed air sprayer. For example, in various embodiments, the aqueous composition is applied with a compressed air powered diaphragm pump. In various embodiments, the aqueous composition is passed through an atomizer nozzle and applied as a spray. Any atomizer nozzle as is known in the art may be used. In various embodiments the atomizer nozzle may be a single-fluid nozzle, a two-fluid nozzle, or a rotary atomizer. For example, in various embodiments, the atomizer nozzle may be a shaped-orifice spray nozzle, pressure-swirl spray nozzle, or a solid-cone nozzle. In various embodiments, the aqueous composition can be applied with a plurality of atomizer nozzles. In various embodiments, the aqueous composition is mixed with a compressed gas before being sprayed. For example, in various embodiments the aqueous composition is mixed with compressed air before being sprayed. But other methods are possible. For example, in various embodiments, the aqueous composition is applied using rollers, sponges, and/or brushes. The present inventors contemplate that the aqueous surfactant-containing composition can be applied to the facing at any convenient point, as long as it is before the board enters the drying oven. Accordingly, the position of the application of the aqueous surfactant-containing composition as described with respect to the FIGURE is merely one option. As another option, the aqueous surfactant-containing composition can be applied to the facing before the slurry is formed thereon, e.g., just after the facing is unrolled from a roll.

Moreover, the present inventors contemplate that the surfactant can be provided on the facing as it is supplied to the board manufacturing process. That is, the facing can be supplied (e.g., by another party) with the surfactant already present thereon. Thus, providing the surfactant on the facing can be performed by purchasing or otherwise obtaining a facing material with the surfactant thereon. In various embodiments, the concentration of the surfactant (e.g., the quaternary ammonium salt surfactant) is substantially higher at the surface of the facing than it is in the bulk of the facing, e.g., at least twice as high or at least five times as high.

As the person of ordinary skill in the art will appreciate, drying of wet building boards is typically conducted at relatively high temperatures. Accordingly, in various embodiments as otherwise described herein, drying the wet building board is performed at one or more temperatures in the range of 175-300° C. Often the initial drying temperature is relatively high, e.g., in the range of 225-300° C., with the temperature reducing as a board passes through the drying oven.

Silicones are often used in moisture-resistant building boards. Moisture resistant plasterboard is often used in bathrooms, laundry rooms, and other spaces that are exposed to water vapor. The silicone helps to make the board less water sensitive, creating a moisture-resistant material to prevent the growth of mildew and mold in the board. The present inventors have unexpectedly determined that flaws in facings (e.g., peelers and rollers as well as scratching of the facing) are a particular problem for plasterboards that include silicones, especially when the facing is paper.

Accordingly, in various embodiments as otherwise described herein, the set plaster core comprises a silicone. The silicone can be present in the set plaster core in a variety of amounts, e.g., in the range of 5-30 lbs silicone per MSF per ⅝", e.g., 5-25 lbs/MSF/(⅝"), or 5-20 lbs/MSF/(⅝"), or 5-15 lbs/MSF/(⅝"), or 8-30 lbs/MSF/(⅝"), or 8-25 lbs/MSF/(⅝"), or 8-20 lbs/MSF/(⅝"), or 8-15 lbs/MSF/(⅝"), or 12-30 lbs/MSF/(⅝"), or 12-25 lbs/MSF/(⅝"), or 12-20 lbs/MSF/(⅝"). In various embodiments, the silicone of the set plaster core is selected from the group consisting of polyalkylsiloxanes, polyalkylhydrosiloxanes, and derivatives thereof. For example, in various embodiments, the silicone in the set plaster core is selected from the group consisting of polydimethylsiloxanes, polymethylhydrosiloxane, and derivatives thereof. Without intending to be bound by theory, the present inventors believe that a number of mechanisms lead to damage in silicone-containing building boards. First, silicones as provided often include lower-molecular weight silicone species such as cyclic siloxanes that can migrate to the facing-plaster interface and reduce adhesion. Moreover, the high temperatures and high water content in the plaster during setting and drying can cause hydrolysis of the silicone, especially the polymethylhydrosiloxanes often used, which can cause additional low-molecular weight silicone species to migrate to the facing-plaster interface. In the high heat of the dryer air streams, these silicone species can volatilize and be oxidized to silicon oxide, which can deposit in particulate form not only inside the dryer but also on the facing surface itself. This can increase the friction of the facing against opposing surfaces (e.g., conveyers and/or other boards), and cause them to grab and tear the facing from the plaster, especially with the reduced adhesion described above. Without intending to be bound by theory, the present inventors believe that the use of a surfactant, especially a cationic surfactant like a quaternary ammonium salt surfactant, can modify the surface charge of the facing surface and reduce the amount of silicon oxide particles that stick to the facing surface and thus reduce the friction at the opposing surfaces.

In various embodiments, especially when the set plaster core includes a silicone, the set plaster core includes a Portland cement. For example, in various embodiments, Portland cement is present in the set plaster core in an amount in the range of 0.1-5 lbs/MSF/(⅝"), e.g., in the range of 0.1-2 lbs/MSF/(⅝"), or 0.1-1 lbs/MSF/(⅝"), or 0.2-5 lbs/MSF/(⅝"), or 0.2-2 lbs/MSF/(⅝"), or 0.2-1 lbs/MSF/ (⅝"), or 0.5-5 lbs/MSF/(⅝") or 0.5-2 lbs/MSF/(⅝").

One common material for plaster building boards is gypsum, i.e., calcium sulfate dihydrate. As the person of ordinary skill in the art will appreciate, such boards are made by providing a slurry of stucco (i.e., calcium sulfate hemihydrate) which hydrates to form the gypsum in as a set plaster core. Accordingly, in desirable embodiments as otherwise described herein, the plaster slurry is a stucco slurry and the set plaster core is a set gypsum core. The plaster slurry can include a variety of additives, e.g., one or more of accelerators, dispersants, foaming agents.

The building boards can have a variety of thicknesses. For example, in various embodiments, the set plaster core has a thickness in the range of ¼" to 1", e.g., in the range of ⅜" to ⅝". For example, in particular embodiments the set plaster core has a thickness of ⅝", or ½", or ⅜", or ¼", or ¾".

As additional examples, in various embodiments, the set plaster core has a thickness in the range of 9-20 mm. For example, in particular embodiments the set plaster core has a thickness of 15 mm; or 12.5 mm; or 9.5 mm; or 10 mm.

Another aspect of the disclosure is a building board comprising a dry plaster core disposed between opposing facings, at least one facing having disposed thereon a surfactant (such as a quaternary ammonium salt surfactant). The building boards of the disclosure can be generally as described with respect to the methods of the disclosure. For example, the surfactant can be as described above, and can be provided on each of the at least one facings in an amount as described above. Silicone can be present in the dry plaster core, for example, using any silicone and/or any amount as described above for the set plaster core. Similarly, Portland cement can be present in the dry plaster core, for example, in any amount as described above for the set plaster core. The dry plaster core is desirably a dry gypsum core, and the building board can be in the form, e.g., of a wallboard, a panel or a tile. The at least one facing on which the surfactant is provided can be, e.g., a paper facing. The dry plaster core can have any desirable thickness, e.g., any thickness as described above with respect to the set plaster core.

The Examples that follow are illustrative of specific embodiments of the method of the disclosure, and various uses thereof. They are set forth for explanatory purposes only, and should not to be taken as limiting the scope of the disclosure.

Example 1

An aqueous composition was formed in a tote mixer by mixing a quaternary ammonium salt surfactant-containing liquid fabric softener (Downy Ultra Soft-brand fabric softener) with water in a ratio of 1:100. The composition is understood from the SmartLabel® online tool to include at least the following components: as surfactant a diethylester dimethyl ammonium chloride (Quaternary ammonium compounds from methyldiethanolamine, $C_{16-18}$ & $C_{18}$-unsatd. fatty acids, and methyl chloride); as a stabilizer polyquaternium-33 (N,N,N-trimethyl-2-[(1-oxo-2-propenyl)oxy] ethanaminium chloride polymer with 2-propenamide); as a chelating agent pentasodium pentetate; as a colorant a proprietary blend of polyoxyalkylene-substituted chromophores; as fragrance a proprietary blend of alcohols, ketones, and aldehydes; as a pH adjuster formic acid; and water as a solvent. The aqueous solution was passed through a compressed air powered diaphragm pump equipped with an atomizer. The compressed air powdered diaphragm pump was positioned before the cutting zone of the production line. Wet silicone-containing plasterboard having paper liners was passed under the compressed air pump via rollers and subsequently sprayed with fine droplets of the aqueous composition at a rate of about 3 gallons per hour, with a line speed of about 65 MSF/hour. The plasterboard then proceeded to the cutting zone where 8 ft, 10 ft, 12 ft, and 16 ft boards were produced. These cut boards were subsequently inverted so as to place the plasterboard face spayed with the aqueous composition in contact with the rollers. The plasterboards were conducted to the drying oven for subsequent drying. In a first trial conducted over 25 minutes of production, no peelers or rollers were observed. In a second trial conducted over a longer period of time, frequency of peelers/rollers was about 1 in every 15 boards. This can be compared with a frequency of peelers/rollers of about 1 in 2 for a similar trial conducted without spraying the aqueous surfactant-containing composition. This trial demonstrates that use of a quaternary ammonium salt surfactant on a facing can significantly reduce damage of boards during and after drying.

Example 2

In another trial, a mixture of quaternary ammonium salt surfactant-containing liquid fabric softener (Downy Ultra Soft-brand fabric softener) with water in a ratio of 1:50 was used. The diluted material was sprayed onto wet gypsum board (product thickness ⅝ inch) having paper liners as described above in Example 1, at a spray rate of about 0.19 gallons per minute and a line speed of about 1 MSF/minute. Silicone was present in the gypsum formulation at a concentration of about 10 lbs/MSF/(⅝"). The plasterboard then proceeded to the cutting zone where 8 ft, 10 ft, 12 ft, and 16 ft boards were produced. These cut boards were subsequently inverted so as to place the plasterboard face spayed with the aqueous composition in contact with the rollers. The plasterboards were conducted to the drying oven for subsequent drying. There were very few rollers and peelers, demonstrating a significant improvement as compared to conventional runs without the use of the surfactant spray. This was the case regardless of whether 0.5 lbs/MSF/(⅝") Portland cement was present in the gypsum formulation. This trial demonstrates that use of a quaternary ammonium salt surfactant on a facing can significantly reduce damage of boards during and after drying.

Additional aspects of the disclosure are provided by the following enumerated embodiments, which may be combined in any number and in any fashion not technically or logically inconsistent:

Embodiment 1. A method for manufacturing a building board comprising:

providing a wet building board by allowing a plaster slurry to set between opposing facings, the wet building board having a set plaster core disposed between the facings; and providing a surfactant (such as a quaternary ammonium salt surfactant) on at least one of the facings (e.g., by applying an aqueous surfactant-containing composition to the facing); then conducting the wet building board to a drying oven, for example, via one or more conveyers (e.g., rollers and/or belts and/or rails); and drying the wet building board in the drying oven to provide the building board having a dry plaster core disposed between the facings.

Embodiment 2. The method of Embodiment 1, wherein the surfactant is a cationic surfactant.

Embodiment 3. The method of Embodiment 1, wherein the surfactant is a quaternary ammonium salt surfactant.

Embodiment 4. The method of Embodiment 3, wherein the quaternary ammonium salt surfactant comprises an esterquat.

Embodiment 5. The method of Embodiment 4, wherein the quaternary ammonium salt surfactant comprises one or more of monoesterquats, diesterquats and triesterquats.

Embodiment 6. The method of Embodiment 4, wherein the esterquat component of the quaternary ammonium salt surfactant comprises mostly diesterquat (e.g., at least 75% diesterquat, such as at least 90%, or at least 95%, or at least 99% diesterquat).

Embodiment 7. The method of Embodiment 4, wherein the esterquat is selected from the group consisting of triethanolamine esterquats, e.g. TEAQs, diethanolamine esterquats, e.g. DEEDMACs, and 3-(dimethylamino)-1,2-propanediol esterquats, e.g. Hamburg esterquats.

Embodiment 8. The method of Embodiment 4, wherein the esterquat has an ammonium cation having the structural formula $(R^1)_nN^+((CHR^2)_xOC(O)R^3)_{(4-n)}$, in which n is 1, 2 or 3; each $R^1$ is independently methyl, ethyl or benzyl; x is 2 or 3; each $R^2$ is independently hydrogen or methyl; and each $R^3$ is $C_{12}$-$C_{22}$ alkyl.

Embodiment 9. The method of Embodiment 3, wherein the quaternary ammonium salt surfactant is a tetraalkylammonium salt, such as a dialkyldimethylammonium salt Embodiment 10. The method of Embodiment 9, wherein the quaternary ammonium salt surfactant has an ammonium cation having the structural formula $(R^5)(R^6)(R^7)(R^8)N^+$, in which each of $R^5$, $R^6$, $R^7$ and $R^8$ are $C_1$-$C_{22}$ alkyl, provided that the total number of carbons in $R^5$, $R^6$, $R^7$ and $R^8$ is at least 12, e.g., at least 16.

Embodiment 11. The method of Embodiment 9, wherein the quaternary ammonium salt surfactant is a di($C_8$-$C_{22}$ alkyl) dimethyl ammonium salt, a di($C_{12}$-$C_{20}$ alkyl)dimethyl ammonium salt, or a di($C_{16}$-$C_{18}$ alkyl)dimethyl ammonium salt.

Embodiment 12. The method of Embodiment 11, wherein the quaternary ammonium salt surfactant is selected from the group consisting of dioctadecylmethyl ammonium chloride, dihexadecyldimethyl ammonium chloride, and dehydrogenatedtallowdimethyl ammonium chloride.

Embodiment 13. The method of any of Embodiments 3-12, wherein the quaternary ammonium salt surfactant includes an anion selected from the group consisting of bromide, chloride, sulfate, and sulfonate.

Embodiment 14. The method of any of Embodiments 3-13, wherein the quaternary ammonium salt surfactant has an HLB value in the range of 1-19, e.g., in the range of 1-15, or 1-11, or 5-19, or 5-15, or 5-11, or 9-19, or 9-15.

Embodiment 15. The method of any of Embodiments 3-14, wherein the quaternary ammonium salt surfactant is present in the aqueous composition in an amount of no more than 2 wt. %, e.g., no more than 1 wt. %, no more than 0.5 wt. %.

Embodiment 16. The method of any of Embodiments 2-14, wherein the quaternary ammonium salt surfactant is present in the aqueous composition in an amount of no more than 0.2 wt. %, e.g., no more than 0.1 wt. %, or no more than 0.05 wt. %.

Embodiment 17. The method of any of Embodiments 2-16, wherein the cationic surfactant (e.g., the quaternary ammonium salt surfactant) is present in the aqueous composition in an amount of at least 0.0002 wt. %, e.g., at least 0.0005 wt. %, or at least 0.001 wt. %.

Embodiment 18. The method of any of Embodiments 2-16, wherein the cationic surfactant (e.g., the quaternary ammonium salt surfactant) is present in the aqueous composition in an amount of at least 0.002 wt. %, e.g., at least 0.005 wt. %, or at least 0.01 wt. %.

Embodiment 19. The method of any of Embodiments 2-18, wherein the cationic surfactant (e.g., the quaternary ammonium salt surfactant) is present in the aqueous composition in an amount in the range of 0.0002-2 wt %, e.g., 0.0002-1 wt %, or 0.0002-0.5 wt %, or 0.0002-0.2 wt %, or 0.0002-0.1 wt %, or 0.0002-0.05 wt %, or 0.0005-2 wt %, or 0.0005-1 wt %, or 0.0005-0.5 wt %, or 0.0005-0.2 wt %, or 0.0005-0.1 wt %, or 0.0005-0.05 wt %.

Embodiment 20. The method of any of Embodiments 2-14, wherein the cationic surfactant (e.g., the quaternary ammonium salt surfactant) is present in the aqueous composition in an amount in the range of 0.001-2 wt %, e.g., 0.001-1 wt %, or 0.001-0.5 wt %, or 0.001-0.2 wt %, or 0.001-0.1 wt %, or 0.001-0.05 wt %, or 0.002-2 wt %, 0.002-1 wt %, or 0.002-0.5 wt %, or 0.002-0.2 wt %, or 0.002-0.1 wt %, or 0.002-0.05 wt %.

Embodiment 21. The method of any of Embodiments 2-14, wherein the cationic surfactant (e.g., the quaternary ammonium salt surfactant) is present in the aqueous composition in an amount in the range of 0.005-2 wt %, e.g., 0.005-1 wt %, or 0.005-0.5 wt %, or 0.005-0.2 wt %, or 0.005-0.1 wt %, or 0.005-0.05 wt %, or 0.01-2 wt %, 0.01-1 wt %, or 0.01-0.5 wt %, or 0.01-0.2 wt %, or 0.01-0.1 wt %, or 0.01-0.05 wt %.

Embodiment 22. The method of any of Embodiments 1-21, wherein the aqueous composition comprises an emulsifier.

Embodiment 23. The method of Embodiment 22, wherein the surfactant is a cationic surfactant and wherein the emulsifier comprises a non-ionic surfactant, an anionic surfactant, or a combination thereof.

Embodiment 24. The method of Embodiment 23, wherein the non-ionic surfactant is selected from the group consisting of alkoxylated fatty alcohols and alkoxylated fatty esters.

Embodiment 25. The method of Embodiment 23 or Embodiment 24, wherein the anionic surfactant is selected from the group consisting of alcohol ether sulfate and alkyl sulfonates.

Embodiment 26. The method of any of Embodiments 23-25, wherein the emulsifier has an HLB in the range of 8-16.

Embodiment 27. The method of any of Embodiments 23-26, wherein the emulsifier is present in the aqueous composition in the range of 0.0001-1 wt. %, e.g. 0.0001-0.5 wt. %, or 0.0001-0.1 wt. %, or 0.0001-0.05 wt. %, or 0.0005-1 wt. %, or 0.0005-0.5 wt. %, or 0.0005-0.1 wt. %, or 0.0005-0.05 wt. %.

Embodiment 28. The method of any of Embodiments 23-26, wherein the emulsifier is present in the aqueous composition in the range of 0.001-1 wt. %, e.g. 0.001-0.5 wt. %, or 0.001-0.1 wt. %, or 0.001-0.05 wt. %, or 0.005-1 wt. %, or 0.005-0.5 wt. %, or 0.005-0.1 wt. %, or 0.005-0.05 wt. %.

Embodiment 29. The method of any of Embodiments 1-28, wherein the aqueous composition comprises a fabric softener, e.g., diluted with water.

Embodiment 30. The method of Embodiment 29, wherein the aqueous composition comprises the fabric softener in a ratio in the range of 0.1-10 parts fabric softener per 100 parts of aqueous composition.

Embodiment 31. The method of Embodiment 29, wherein the aqueous composition comprises the fabric softener in a ratio in the range of 0.1-5 parts fabric softener per 100 parts of aqueous composition, e.g., 0.1-3 parts, or 0.1-2 parts, or 0.1-1 parts fabric softener per 100 parts of aqueous composition.

Embodiment 32. The method of Embodiment 29, wherein the aqueous composition comprises the fabric softener in a ratio in the range of 0.2-10 parts fabric softener per 100 parts of aqueous composition, e.g., 0.2-5 parts, or 0.2-3 parts, or 0.2-2 parts, or 0.2-1 parts fabric softener per 100 parts of aqueous composition.

Embodiment 33. The method of Embodiment 29, wherein the aqueous composition comprises the fabric softener in a ratio in the range of 0.5-10 parts fabric softener per 100 parts of aqueous composition, e.g., 0.5-5 parts, or 0.5-3 parts, or 0.5-2 parts fabric softener per 100 parts of aqueous composition.

Embodiment 34. The method of Embodiment 29, wherein the aqueous composition comprises the fabric softener in a ratio in the range of 1-10 parts fabric softener per 100 parts of aqueous composition, e.g., 1-5 parts, or 1-3 parts fabric softener per 100 parts of aqueous composition.

Embodiment 35. The method of any of Embodiments 1-34, wherein the aqueous composition is applied to the facing at a treat rate in the range of 0.005-1 gal/MSF, e.g., in the range of 0.01-1 gal/MSF, or 0.02-1 gal/MSF, or 0.04-1 gal/MSF, or 0.005-0.5 gal/MSF, or 0.01-0.5 gal/MSF, or 0.02-0.5 gal/MSF, or 0.04-0.5 gal/MSF, or 0.005-0.2 gal/MSF, or 0.01-0.2 gal/MSF, or 0.02-0.2 gal/MSF, or 0.04-0.2 gal/MSF, or 0.005-0.1 gal/MSF, or 0.01-0.1 gal/MSF, or 0.02-0.1 gal/MSF, or 0.04-0.1 gal/MSF.

Embodiment 36. The method of any of Embodiments 1-35, wherein the surfactant (e.g., the quaternary ammonium salt surfactant) is provided on the facing in an amount in the range of 0.01-10 g/MSF, e.g., in the range of 0.01-5 g/MSF, or 0.01-2 g/MSF, or 0.01-1 g/MSF, or 0.01-0.5 g/MSF, or 0.01-0.2 g/MSF.

Embodiment 37. The method of any of Embodiments 1-35, wherein the surfactant (e.g., the quaternary ammonium salt surfactant) is provided on the facing in an amount in the range of 0.02-10 g/MSF, e.g., 0.02-5 g/MSF, or 0.02-2 g/MSF, or 0.02-1 g/MSF, or 0.02-0.5 g/MSF, or 0.02-0.2 g/MSF.

Embodiment 38. The method of any of Embodiments 1-35, wherein the surfactant (e.g., the quaternary ammonium salt surfactant) is provided on the facing in an amount in the range of 0.05-10 g/MSF, e.g., 0.05-5 g/MSF, or 0.05-2 g/MSF, or 0.05-1 g/MSF, or 0.05-0.5 g/MSF, or 0.05-0.2 g/MSF.

Embodiment 39. The method of any of Embodiments 1-35, wherein the surfactant (e.g., the quaternary ammonium salt surfactant) is provided on the facing in an amount in the range of 0.1-10 g/MSF, e.g., 0.1-5 g/MSF, or 0.1-2 g/MSF, or 0.1-1 g/MSF, or 0.1-0.5 g/MSF, or 0.1-0.2 g/MSF.

Embodiment 40. The method of any of Embodiments 1-35, wherein the surfactant (e.g., the quaternary ammonium salt surfactant) is provided on the facing in an amount in the range of 0.2-10 g/MSF, e.g., 0.2-5 g/MSF, or 0.2-2 g/MSF, or 0.2-1 g/MSF, or 0.2-0.5 g/MSF.

Embodiment 41. The method of any of Embodiments 1-35, wherein the surfactant (e.g., the quaternary ammonium salt surfactant) is provided on the facing in an amount in the range of 0.5-10 g/MSF, e.g., 0.5-5 g/MSF, or 0.5-2 g/MSF, or 0.5-1 g/MSF.

Embodiment 42. The method of any of Embodiments 1-41, wherein the surfactant is provided on the facing by applying an aqueous surfactant-containing composition to the facing.

Embodiment 43. The method of Embodiment 42, wherein the aqueous composition is applied as a spray.

Embodiment 44. The method of any of Embodiments 1-43, wherein drying the wet building board is performed at one or more temperatures in the range of 175-300° C.

Embodiment 45. The method of any of Embodiments 1-44, further comprising conducting the building board beyond the drying oven via one or more conveyers (e.g., rollers and/or belts) in contact with the facing.

Embodiment 46. The method of any of Embodiments 1-45, wherein the set plaster core comprises a silicone.

Embodiment 47. The method of Embodiment 46, wherein the silicone is present in the set plaster core in an amount in the range of 5-30 lbs silicone per MSF/(⅝"), e.g., 5-25 lbs/MSF/(⅝"), or 5-20 lbs/MSF/(⅝"), or 5-15 lbs/MSF/(⅝"), or 8-30 lbs/MSF/(⅝"), or 8-25 lbs/MSF/(⅝"), or 8-20 lbs/MSF/(⅝"), or 8-15 lbs/MSF/(⅝"), or 12-30 lbs/MSF/(⅝"), or 12-25 lbs/MSF/(⅝"), or 12-20 lbs/MSF/(⅝").

Embodiment 48. The method of Embodiment 46 or Embodiment 47, wherein the silicone of the set plaster core is selected from the group consisting of polydimethylsiloxane, polymethylhydrosiloxane, and derivatives thereof.

Embodiment 49. The method of any of Embodiments 1-48, wherein the set plaster core comprises a Portland cement.

Embodiment 50. The method of Embodiment 49, wherein the Portland cement is present in the set plaster core in an amount in the range of 0.1-5 lbs/MSF/(⅝"), e.g., in the range of 0.1-2 lbs/MSF/(⅝"), or 0.1-1 lbs/MSF/(⅝"), or 0.2-5 lbs/MSF/(⅝"), or 0.2-2 lbs/MSF/(⅝"), or 0.2-1 lbs/MSF/(⅝"), or 0.5-5 lbs/MSF/(⅝") or 0.5-2 lbs/MSF/(⅝").

Embodiment 51. The method of any of Embodiments 1-50, wherein the plaster slurry is a stucco slurry, and wherein the set plaster core is a set gypsum core.

Embodiment 52. The method of any of Embodiments 1-51, wherein the building board is in the form of a wallboard, a panel or a tile.

Embodiment 53. The method of any of Embodiments 1-52, wherein at least one facing on which the surfactant is provided is a paper facing.

Embodiment 54. The method of any of Embodiments 1-53, wherein the set plaster core has a thickness in the range of ¼" to 1", e.g., in the range of ⅜" to ⅝".

Embodiment 55. The method of any of Embodiments 1-53, wherein the set plaster core has a thickness of ⅝".

Embodiment 56. The method of any of Embodiments 1-53, wherein the set plaster core has a thickness of ½".

Embodiment 57. The method of any of Embodiments 1-53, wherein the set plaster core has a thickness of ⅜", ¼" or ¾".

Embodiment 58. The method of any of Embodiments 1-53, wherein the set plaster core has a thickness in the range of 9-20 mm.

Embodiment 59. The method of any of Embodiments 1-53, wherein the set plaster core has a thickness of 15 mm.

Embodiment 60. The method of any of Embodiments 1-53, wherein the set plaster core has a thickness of 12.5 mm.

Embodiment 61. The method of any of Embodiments 1-53, wherein the set plaster core has a thickness of 9.5 mm or 10 mm.

Embodiment 62. A building board comprising a dry plaster core disposed between opposing facings, at least one facing having disposed thereon a surfactant (such as a quaternary ammonium salt surfactant).

Embodiment 63. The building board of Embodiment 62, wherein the surfactant is as described in any of Embodiments 2-14.

Embodiment 64. The building board of Embodiment 62 or Embodiment 63, wherein the surfactant is present on each of the at least one facings in an amount as described in any of Embodiments 36-41.

Embodiment 65. The method or building board of any of Embodiments 1-64, wherein silicone is present in the dry plaster core, for example, in an amount as described in Embodiment 47.

Embodiment 66. The method or building board of Embodiment 65, wherein the silicone of the dry plaster core is selected from the group consisting of polydimethylsiloxane, polymethylhydrosiloxane, and derivatives thereof.

Embodiment 67. The method or building board of any of Embodiments 1-66, wherein Portland cement is present in the dry plaster core, for example, in an amount as described in Embodiment 49.

Embodiment 68. The method or building board of any of Embodiments 1-67, wherein the dry plaster core is a dry gypsum core.

Embodiment 69. The building board according to any of Embodiments 62-68, wherein the building board is in the form of a wallboard, a panel or a tile.

Embodiment 70. The building board according to any of Embodiments 62-69, wherein at least one facing on which the surfactant is provided is a paper facing.

Embodiment 71. The method or building board according to any of Embodiments 1-70, wherein the dry plaster core has a thickness in the range of ¼" to 1", e.g., in the range of ⅜" to ⅝".

Embodiment 72. The method or building board according to any of Embodiments 1-70, wherein the dry plaster core has a thickness of ⅝".

Embodiment 73. The method or building board according to any of Embodiments 1-70, wherein the dry plaster core has a thickness of ½".

Embodiment 74. The method or building board according to any of Embodiments 1-70, wherein the dry plaster core has a thickness of ⅜", ¼" or ¾".

Embodiment 75. The method or building board according to any of Embodiments 1-70, wherein the dry plaster core has a thickness in the range of 9-20 mm.

Embodiment 76. The method or building board according to any of Embodiments 1-70, wherein the dry plaster core has a thickness of 15 mm.

Embodiment 77. The method or building board according to any of Embodiments 1-70, wherein the dry plaster core has a thickness of 12.5 mm.

Embodiment 78. The method or building board according to any of Embodiments 1-70, wherein the dry plaster core has a thickness of 9.5 mm or 10 mm.

Embodiment 79. The building board of any of Embodiments 62-78, made by a method according to any of Embodiments 1-61.

As noted above "MSF" means 1000 square feet. The person of ordinary skill in the art will calculate equivalent areas in square meters by using the conversion $$1000 \text{ ft}^2 = 92.903 \text{ m}^2.$$

"Gal" is an abbreviation for gallons, and refers to U.S. liquid gallons. The person of ordinary skill in the art will calculate equivalent volumes in liters by using the conversion $$1 \text{ gal} = 3.7854 \text{ L}.$$

"lbs" is an abbreviation for pounds, and refers to U.S. pounds. The person of ordinary skill in the art will calculate equivalent masses in grams by using the conversion $$1 \text{ lb} = 453.59 \text{ g}.$$

Certain distances are provided in inches ("). The person of ordinary skill in the art will calculate equivalent distances in centimeters and in meters by using the conversion $$1" = 2.54 \text{ cm} = 0.0254 \text{ m}.$$

Concentrations of materials in set plaster cores are provided herein in terms of lbs/MSF/(⅝"), which is pounds per (1000 square feet of ⅝" thickness of set plaster core material). The person of ordinary skill in the art can convert these concentration into other units (e.g., g per m3) using the appropriate conversion factors.

The invention claimed is:

1. A method for manufacturing a building board comprising:

providing a wet building board by allowing a plaster slurry to set between opposing facings, the wet building board having a set plaster core disposed between the facings; and applying a diesterquat surfactant on at least one of the facings of the wet building board, each of the at least one of the facings on which the diesterquat surfactant is provided being a paper facing; then conducting the wet building board to a drying oven via one or more first conveyers in contact with the at least one facing on which the diesterquat surfactant is applied;

drying the wet building board in the drying oven to provide the building board; and conducting the building board beyond the drying oven via one or more second conveyers in contact with the at least one facing on which the diesterquat surfactant is applied.

2. The method of claim 1, wherein the diesterquat esterquat has an ammonium cation having the structural formula $(R^1)_n N^+((CHR^2)_x OC(O)R^3)_{(4-n)}$, in which n is 2; each $R^1$ is independently methyl, ethyl or benzyl; x is 2 or 3; each $R^2$ is independently hydrogen or methyl; and each $R^3$ is $C_{12}$-$C_{22}$ alkyl.

3. The method of claim 1, wherein the diesterquat surfactant is provided on the facing by applying a diesterquat surfactant-containing aqueous composition to the facing, the diesterquat surfactant being present in the aqueous composition in an amount in the range of 0.005-2 wt %.

4. The method of claim 1, wherein the diesterquat surfactant is provided on the facing by applying a diesterquat surfactant-containing aqueous composition to the facing, the aqueous composition comprising a laundry fabric softener composition containing the diesterquat surfactant diluted with water.

5. The method of claim 4, wherein the aqueous composition comprises the laundry fabric softener in a ratio in the range of 0.1-10 parts of the laundry fabric softener composition per 100 parts of aqueous composition.

6. The method of claim 1, wherein the diesterquat surfactant is provided on the facing by applying a diesterquat surfactant-containing aqueous composition to the facing, the aqueous composition being applied to the facing at a treat rate in the range of 0.005-1 gal/MSF.

7. The method of claim 1, wherein the diesterquat surfactant is provided on the facing in an amount in the range of 0.01-10 g/MSF.

8. The method of claim 1, wherein the diesterquat surfactant is provided on the facing in an amount in the range of 0.2-5 g/MSF.

9. The method of claim 1, wherein the set plaster core comprises a silicone.

10. The method of claim 9, wherein the silicone is present in an amount in the range of 0.5-20 lbs/MSF/(⅝").

11. The method of claim 1, wherein the plaster slurry is a stucco slurry, and wherein the set plaster core is a set gypsum core.

12. The method of claim 1, wherein the set plaster core has wherein the set plaster core has a thickness in the range of ¼" to 1".

13. The method of claim 1, wherein the one or more first conveyors comprise one or more rollers, belts and/or rails.

14. The method of claim 2, wherein each $R^1$ is methyl; x is 2; each $R^2$ is hydrogen; and each $R^3$ is $C_{14}$-$C_{18}$ alkyl.

15. The method of claim 1, wherein the one or more second conveyors comprise one or more rollers, belts and/or rails.

16. The method of claim 1, wherein
the diesterquat has an ammonium cation having the structural formula $(R^1)_nN^+((CHR^2)_xOC(O)R^3)_{(4-n)}$, in which n is 2; each $R^1$ is methyl; x is 2; each $R^2$ is independently hydrogen; and each $R^3$ is $C_{14\text{-}18}$ alkyl;
the set plaster core comprises a silicone present in an amount in the range of 0.5-20 lbs/MSF/(⅝"); and the diesterquat surfactant is provided on the facing in an amount in the range of 0.2-5 g/MSF.

17. The method of claim 1, wherein
the set plaster core comprises a silicone present in an amount in the range of 0.5-20 lbs/MSF/(⅝"); and
the diesterquat surfactant is provided on the facing in an amount in the range of 0.2-5 g/MSF.

18. The method of claim 1, wherein
the diesterquat has an ammonium cation having the structural formula $(R^1)_nN^+((CHR^2)_xOC(O)R^3)_{(4-n)}$, in which n is 2; each $R^1$ is independently methyl, ethyl or benzyl; x is 2 or 3; each $R^2$ is independently hydrogen or methyl; and each $R^3$ is $C_{12}$-$C_{22}$ alkyl;
the set plaster core comprises a silicone present in an amount in the range of 0.5-20 lbs/MSF/(⅝"); and
the diesterquat surfactant is provided on the facing in an amount in the range of 0.2-5 g/MSF.

19. The method of claim 1, wherein the diesterquat surfactant is provided on the facing by spraying a diesterquat surfactant-containing aqueous composition on the facing.

* * * * *